UNITED STATES PATENT OFFICE.

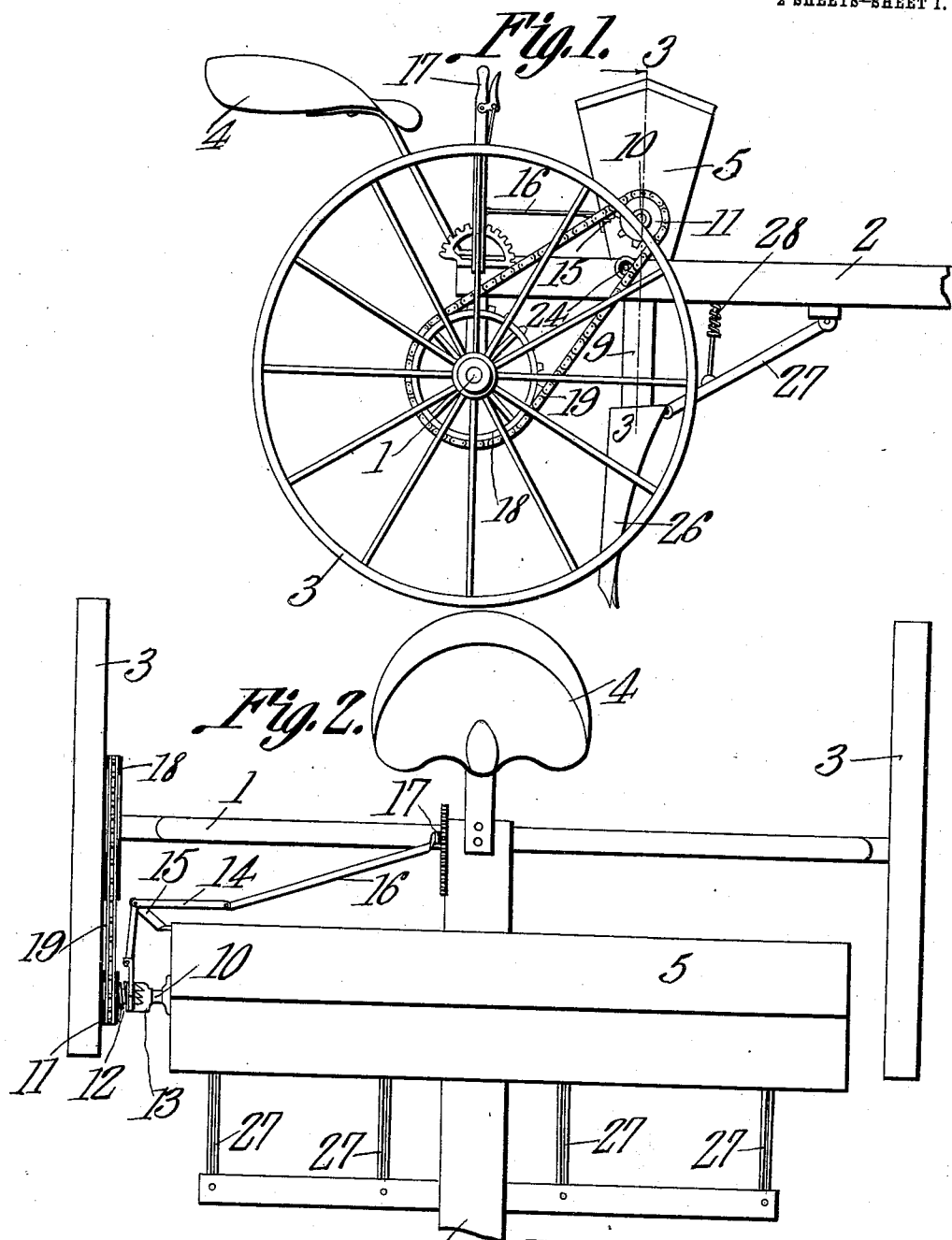

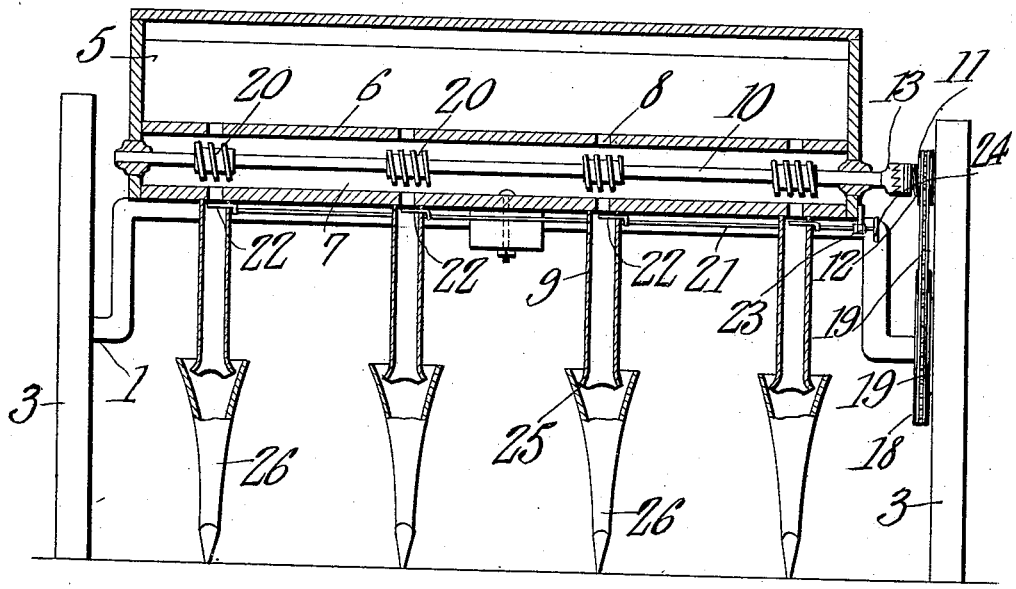
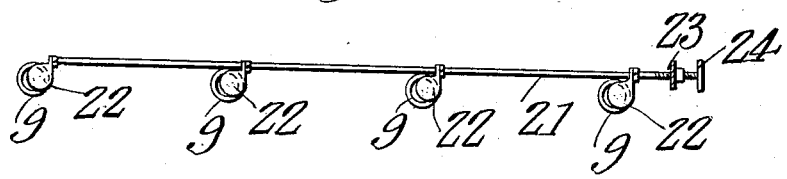

ERNEST B. RAHNER, OF CAZENOVIA, ILLINOIS.

COMBINED CULTIVATOR AND SEEDER.

992,248.	Specification of Letters Patent.	Patented May 16, 1911.

Application filed April 20, 1910. Serial No. 556,505.

*To all whom it may concern:*

Be it known that I, ERNEST B. RAHNER, a citizen of the United States, residing at Cazenovia, in the county of Woodford and State of Illinois, have invented a new and useful Combined Cultivator and Seeder, of which the following is a specification.

This invention relates to a combined cultivator and seeder and it consists in the novel construction and arrangement of its parts as hereinafter shown and described.

The object of the invention is to provide a combined machine as indicated which is adapted especially to be used for cultivating crops such as corn or other crops planted in rows and which is intended to be used at the last cultivation of the crops for the purpose of planting as for instance clover or the like between the rows.

With this object in view the machine includes a wheel-mounted frame upon which is located a hopper. The hopper is provided in its bottom with a seed chamber through which extends a shaft having at intervals along its length spirally disposed worms.

Seed outlets establish communication between the interior of the hopper and the seed chamber and seed tubes are connected at their upper ends with the bottom of the seed chamber and an adjustable means is provided for increasing or decreasing the transverse area of the passageways through the seed tubes just below their points of connection with the seed chamber. Soil cultivating or furrow opening shoes are attached to the frame and at their upper ends receive the lower portion of the said seed tubes, and means is provided for operatively connecting the shaft in the seed chamber with one of the supporting wheels of the machine.

In the accompanying drawings;—Figure 1 is a side elevation of the combined cultivator and seeder. Fig. 2 is a top plan view of the same. Fig. 3 is a vertical sectional view of the same cut on the line 3—3 of Fig. 1. Fig. 4 is a detail plan view of the adjustable means for regulating the transverse area of the passages through the seed tubes.

The frame of the machine consists of an arch axle 1 to the middle of which is secured the rear end of a draft tongue 2. Supporting wheels 3 are journaled at the ends of the axle 1 and an operator's seat 4 is mounted upon the rear end of the tongue 2. A seed hopper 5 is mounted upon the rear portion of the tongue 2 and is approximately parallel with the axle 1. The hopper 5 is provided in its lower portion with a partition 6 between which and the bottom of the hopper is formed a seed chamber 7. Seed outlets 8 establish communication between the interior of the hopper 5 and the interior of the seed chamber 7. Tubes 9 communicate at their upper ends with the seed chamber 7 through the bottom of the hopper 5 and their upper ends are located directly below the seed outlets 8 provided in the partition 6.

A shaft 10 is journaled at its end portion in the ends of the seed chamber 7 and a sprocket wheel 11 is journaled upon one end of the said shaft 10. The sprocket wheel 11 is provided with a clutch hub 12 and a clutch member 13 is slidably mounted upon the shaft 10 but is constrained to rotate in unison with the same or vice versa. A bell crank lever 14 is fulcrumed upon a bracket 15 attached to the hopper 5 and at one end operatively engages the clutch member 13 and a link 16 is pivotally connected with the other end of the bell crank lever 14 and operatively connects the same with a manually operable lever 17 fulcrumed upon the tongue 2 in the vicinity of the operator's seat 4. A sprocket wheel 18 is mounted for coincident rotation with one of the supporting wheels 3 and a sprocket chain 9 passes around the sprocket wheels 11 and 18 and is adapted to transmit rotary movement from the ground wheel 3 to which the wheel 18 is attached to the said sprocket wheel 11. Thus it will be seen that when the lever 17 is swung through the connecting link 16 and bell crank lever 14 the clutch member 13 may be moved into engagement with the clutch hub 12 of the sprocket wheel 11 or out of engagement therewith.

A series of spaced spirally disposed worms 20 is located upon the shaft 10 and each member of the series of worms is located between one of the seed outlets 8 and the upper end of one of the seed tubes 9.

A longitudinally slidable rod 21 is located below the bottom of the hopper 5 and a series of gates 22 is operatively connected with the said rod 21. One gate 22 is located in each of the seed tubes 9 in the vicinity of that point of connection with the bottom of the hopper 5. A threaded bracket 23 depends from one end of the hopper 5 and receives a threaded portion of the rod 21. A hand wheel 24 is fixed to one end of the rod 21 and by turning the said rod 21 by using the hand wheel 24 it is obvious that the engagement of the thread upon the rod 21 with the internal thread in the bracket 23 that the said rod 21 will be moved longitudinally and consequently the gate 22 will be moved or adjusted within the upper portions of the seed tubes 9. Thus means is provided for increasing or diminishing the transverse area of the seed passages through the tubes 9. The said tubes may be of any desired form but as shown in Fig. 3 of the drawings it is preferred that they be provided at their lower ends each with several seed outlets 25 in order that the seed when it passes from the lower ends of the said tubes will be scattered or separated. Furrow opening shoes 26 are connected with the tongue 2 by means of draw-bars 27 in the usual manner and the said shoes 26 at their upper ends receive the lower ends of the seed tubes 9. The shoes 26 may be of any desired or approved pattern, and may, if desired, be held in contact with the soil under spring tension, as indicated at 28 in Fig. 1 of the drawing.

As above stated the machine is designed to be used at the last cultivation of a crop for the purpose of planting seeds simultaneously with the operation of cultivation and by reason of the fact that the machine is provided with an arch axle 1 it may be used as a straddle row machine, or it may be used between two adjacent rows.

The seed is deposited in the hopper 5 and as the machine progresses along the rows of plants, the seed gravitates through the outlets 8 into the seed chamber 7 and is eventually engaged by the worm 20 and separated and moved toward the upper end of the seed tubes 9. From the seed chamber 7 the seed passes through the tubes 9 into the shoes 26 and through the shoes into the furrows opened by the same in the usual manner. As indicated, the quantity of seed which passes through the tubes 9 may be governed to a nicety by adjusting the rod 21 which in turn will adjust the valve 22 in the upper end of the said tubes 9. Therefore, it will be seen that a simple and effective machine is provided which may be economically used for the purpose of seeding the soil at the last time that it is cultivated in connection with a growing crop and that during the process of seeding the soil advantage is taken of the fact that during the operation of cultivating the same shallow furrows are opened which are utilized as pockets for the reception of the seed being sown. Not only does this method of seeding the soil at the same time that it is cultivated economize labor, but, owing to the fact that the growing crop will have attained considerable proportions at the time that the sown seed will sprout the plants germinating from the seed will be shaded and protected by the crop advancing to maturity.

Having described the invention what I claim as new and desire to secure by Letters Patent is:—

In a planter, a hopper, seed tubes connected at their upper ends with the bottom of the hopper, an agitator within the hopper, said seed tubes being formed at their said upper ends with slots, a bracket at one end of the hopper, a rod adjustably threaded through the bracket and extending lengthwise beneath the hopper and in juxtaposition to the said upper ends of the seed tubes, adjustable abutments upon the rod at intervals, and gates having shanks confined between the abutments, the gates fitting slidably in the slots in the upper ends of the seed tubes.

In testimony that I claim the foregoing as my own, I have hereto affixed my signature in the presence of two witnesses.

ERNEST B. RAHNER.

Witnesses:
LEWIS J. JOHNSON,
GEORGE CONAWAY.

Copies of this patent may be obtained for five cents each, by addressing the "Commissioner of Patents, Washington, D. C."